United States Patent
Foster et al.

(10) Patent No.: US 7,354,363 B2
(45) Date of Patent: Apr. 8, 2008

(54) MAGNETORHEOLOGICAL FLUID V-RIBBED BELT TENSIONER WITH THROUGH SHAFT

(75) Inventors: Randy C. Foster, Strafford, MO (US); Richard J. Meckstroth, Vonore, TN (US)

(73) Assignee: Dayco Products, LLC, Miamisburg, OH (US)

(*) Notice: Subject to any disclaimer, the term of this patent is extended or adjusted under 35 U.S.C. 154(b) by 732 days.

(21) Appl. No.: 10/848,768

(22) Filed: May 18, 2004

(65) Prior Publication Data

US 2005/0261094 A1 Nov. 24, 2005

(51) Int. Cl.
*F16H 7/08* (2006.01)
*F16H 7/12* (2006.01)

(52) U.S. Cl. .................. 474/110; 474/135
(58) Field of Classification Search ............... 474/110, 474/109, 133, 135, 119; 188/267.1, 267.2, 188/300, 313, 317–318, 378; 137/251.1, 137/514.3, 909; 416/107, 140
See application file for complete search history.

(56) References Cited

U.S. PATENT DOCUMENTS

| | | | | |
|---|---|---|---|---|
| 2,820,471 A | * | 1/1958 | Crowell ................ 137/251.1 |
| 5,029,677 A | * | 7/1991 | Mitsui .................... 188/267.1 |
| 5,161,653 A | * | 11/1992 | Hare, Sr. ................ 137/514.3 |
| 5,277,281 A | * | 1/1994 | Carlson et al. ............ 188/267 |
| 5,439,420 A | * | 8/1995 | Meckstroth et al. ........ 474/133 |
| 5,752,891 A | | 5/1998 | Meckstroth et al. |
| 5,992,582 A | * | 11/1999 | Lou et al. ................ 188/267.1 |
| 6,019,201 A | * | 2/2000 | Gordaninejad et al. .. 188/267.1 |
| 6,095,486 A | | 8/2000 | Ivers et al. |
| 6,131,709 A | | 10/2000 | Jolly et al. |
| 6,427,813 B1 | * | 8/2002 | Carlson ................... 188/267.2 |
| 6,746,352 B1 | * | 6/2004 | Poiret et al. ............... 474/110 |
| 7,217,206 B2 | * | 5/2007 | Stone et al. ............... 474/110 |

FOREIGN PATENT DOCUMENTS

EP           1270989 A1 *  1/2003
JP       2003035345 A  *  2/2003
WO    WO 2004001170 A1 * 12/2003

* cited by examiner

*Primary Examiner*—Marcus Charles
(74) *Attorney, Agent, or Firm*—Joseph V. Tassone; Thompson Hine LLP

(57) ABSTRACT

A tensioner for a power transmitting belt is provided having a base, an arm pivotably attached to the base, a pulley rotatably attached to the arm and a spring operatively connected to the arm and the base for urging the arm in direction to tension the belt. A hydraulic strut is pivotably attached to the base and the arm to restrict the movement of the arm through asymmetric fluid damping. The hydraulic strut includes a hydraulic cylinder filled with magnetorheological fluid, a piston rod axially mounted through the cylinder and a piston mounted on the piston rod to divide the cylinder into first and second fluid chambers. The strut further includes a fluid flow path between the first and second fluid chambers, a check valve in the fluid flow path to provide asymmetric fluid flow and a coil that is operable to generate a magnetic field across the fluid flow path when energized. When the coil is energized fluid flow between the first and second fluid chambers is halted such that the arm of the tensioner locks up.

20 Claims, 3 Drawing Sheets

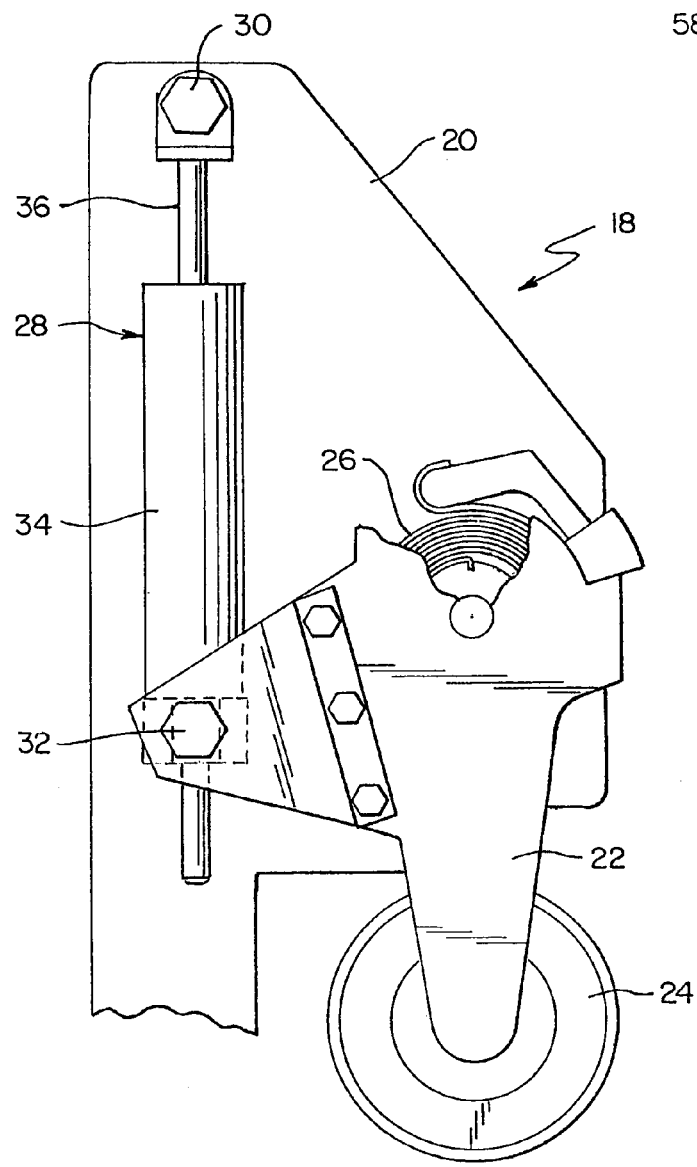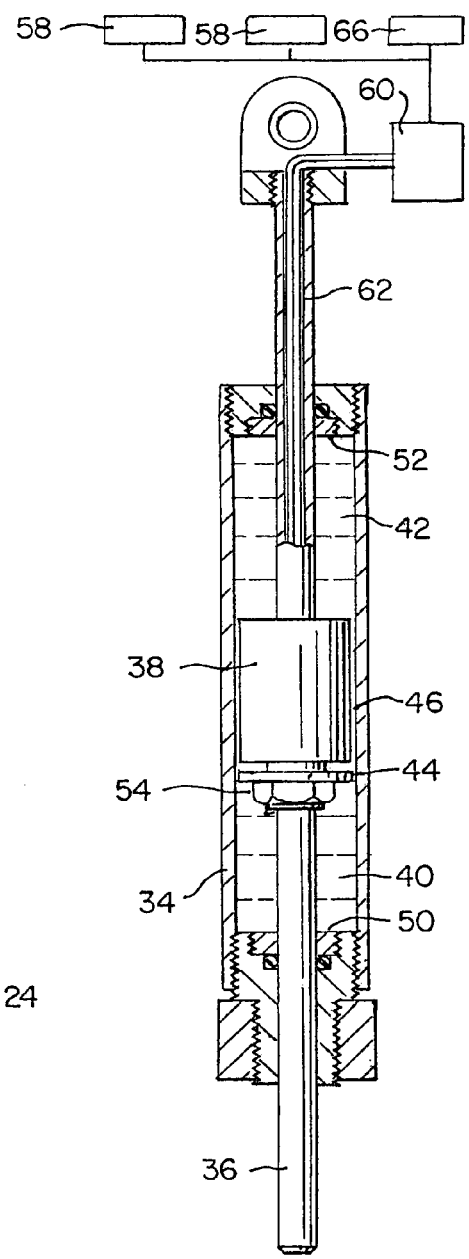
FIG.2
FIG.3

MAGNETORHEOLOGICAL FLUID V-RIBBED BELT TENSIONER WITH THROUGH SHAFT

TECHNICAL FIELD

The present invention relates generally to belt tensioners, and more specifically to a magnetorheological, asymmetric belt tensioner that can be locked solid.

BACKGROUND

In a typical automobile engine power is transmitted from the engine crankshaft to one or more accessories using an endless polymeric belt. The belt may be driven by a driving sheave connected to the engine crankshaft and drive one or more driven sheaves connected to the accessories. The accessories may include, for example, an alternator, an alternator/generator/starter device, a compressor, or a power steering device.

A variety of belt tensioners have been proposed for maintaining the required tension in the power-transmitting belt to avoid belt slippage even during non-steady-state or transient conditions. For optimal function of a belt tensioner, it is desirable that the tensioner move quickly and easily toward the belt to take up slack but provide greater resistance to lifting of the tensioner away from the belt. This feature is desirable for proper control of steady state accessory torque loads that are occasionally interrupted with reverse transient load such as a wide-open-throttle one-two gear shift in a manual or automatic transmission. It is also desirable that the tensioner be lockable during certain operating conditions. For example, when the engine is cranking during start-up, accessory drive system resonance can occur that may cause excessive tensioner motion. During this condition it may be desirable to lock the tensioner solid until the engine reaches idle.

Accordingly, a new tensioner design having the aforementioned capabilities is desired.

SUMMARY

In a first aspect, an asymmetric, magnetorheological fluid damper is provided for use with a belt tensioner. The damper comprises a hydraulic cylinder containing a magnetorheological fluid, a piston rod axially mounted through the cylinder and a piston mounted on the piston rod to divide the cylinder into a first fluid chamber and a second fluid chamber. The damper further comprises a fluid flow path between the first and second fluid chambers, a check valve in the fluid flow path and a coil to generate a magnetic field across the fluid flow path when energized. When the coil is energized fluid flow through the fluid flow path is halted to lock-up the damper.

In a second aspect, a tensioner for a power transmitting belt is provided having a base, an arm pivotably attached to the base, a pulley rotatably attached to the arm and a spring operatively connected to the arm and the base for urging the arm in direction to tension the belt. A hydraulic strut is pivotably attached to the base and the arm to restrict the movement of the arm through asymmetric fluid damping. The hydraulic strut according to this aspect includes a hydraulic cylinder filled with magnetorheological fluid, a piston rod axially mounted in the cylinder and a piston mounted on the piston rod to divide the cylinder into first and second fluid chambers. The strut further includes a fluid flow path between the first and second fluid chambers, a check valve in the fluid flow path to provide asymmetric fluid flow and a coil that is operable to generate a magnetic field across the fluid flow path when energized.

In a third aspect, a tensioner for a power transmitting belt is provided having a base, an arm pivotably attached to the base, a pulley rotatably attached to the arm and a spring operatively connected to the arm and the base for urging the arm in direction to tension the belt. A hydraulic strut is pivotably attached to the base and the arm to restrict the movement of the arm through asymmetric fluid damping. The hydraulic strut according to this aspect includes a hydraulic cylinder filled with magnetorheological fluid, a piston rod axially mounted in the cylinder and a piston mounted on the piston rod to divide the cylinder into first and second fluid chambers. The strut further includes a fluid flow path between the first and second fluid chambers, a check valve in the fluid flow path to provide asymmetric fluid flow and a coil that is operable to generate a magnetic field across the fluid flow path when energized. When the coil is energized fluid flow between the first and second fluid chambers is halted such that the arm of the tensioner locks up.

BRIEF DESCRIPTION OF THE DRAWINGS

FIG. 2 is a top, partially cut-away view of the belt tensioner of FIG. 1;

FIG. 3 is a partial cross section of a hydraulic strut according to another aspect;

DETAILED DESCRIPTION

Figure 1:
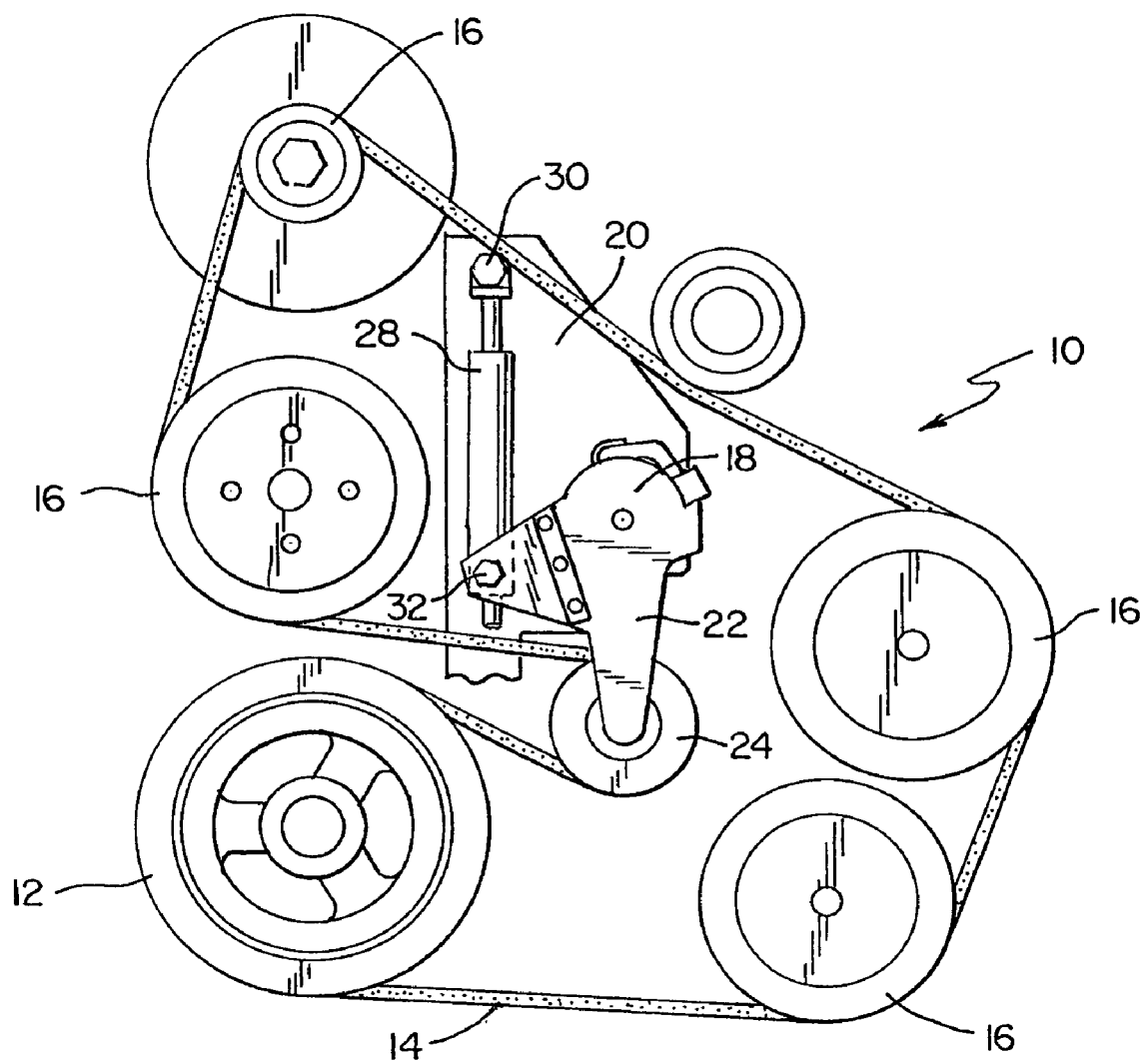
FIG. 1 is an illustration of a typical front end accessory drive system utilizing a belt tensioner according to one aspect of the present invention.

FIG. 1 depicts a standard front end accessory drive system utilizing a belt tensioner according to a first aspect of the invention. The front end accessory drive system 10 includes a crankshaft sheave 12, an endless polymeric belt 14 and a plurality of accessory sheaves 16, which may be coupled to accessories such as a compressor, an alternator/starter/generator device or a power steering device. During normal operating conditions power is transmitted from the crank sheave 12 to the accessory sheaves 16 through the belt 14. During some operating conditions, however, for example during start-up, one of the accessory sheaves may actually drive the system 10. A tensioner 18 is engaged with the belt 14, for example in a span adjacent the crankshaft sheave 12, to maintain tension in the belt 14 regardless of which operating condition the drive system 10 is in. The tensioner 18 may include a separate base 20, which may be rigidly attached to an engine. Alternatively, the base of the tensioner 18 may comprise the engine or vehicle frame itself.

Referring to FIG. 2, according to one embodiment, the belt tensioner 18 of the present invention includes a base 20, an arm 22 pivotably attached to the base 20, a pulley 24 rotatably attached to the arm 22 and a spring 26 that is operatively connected to the arm 22 and the base 20 for urging the arm 22 to pivot relative to the base 20 such that the pulley 24 on the arm 22 engages the belt 14 with a force to tension the belt 14. The spring 26 may be a flat, spiral wound spring, as shown, or any suitable spring including, for example, a linear spring.

The tensioner 18 according to the first embodiment further includes a hydraulic strut or damper 28 that is pivotably attached at a first point 30 to the base and pivotably attached at a second point 32 to the arm such that pivotal movement of the arm on the base either extends or compresses the strut. In this arrangement, the strut 28 is operable to restrict the movement of the tensioner arm 22 through asymmetric fluid damping.

The strut 28 includes a hydraulic cylinder 34, a piston rod 36 that is axially mounted through the cylinder, a piston 38 that divides the hydraulic cylinder into a first fluid chamber 40 and a second fluid chamber 42 and a check valve 44 that is located in a fluid flow path 46 between the first and second fluid flow chambers 40, 42. An electromagnetic coil 48, which may be located within the piston 38, is operable to generate a magnetic field across the fluid flow path 46 when energized. The first and second fluid chambers 40, 42 within the strut each contain a magnetorheological fluid ("MR fluid"). One possible MR fluid is Lord's MRF-132AD.

In the embodiment shown in FIG. 2, the piston rod 36 is pivotably attached to the base 20 and the hydraulic cylinder 34 is pivotably attached to the arm 22 of the tensioner such that pivotal movement of the arm 22 on the base 20 will cause the cylinder 34 to slide over the piston rod 36. In an alternative embodiment, the piston rod 36 could be pivotably attached to the arm 22 and the cylinder 34 could be pivotably attached to the base 20 such that pivotal movement of the arm 22 would cause the piston rod 36 to slide within the cylinder 34. In either arrangement the length of the piston rod 36 may be great enough such that the rod extends completely through the hydraulic cylinder 34, both through a first end 50 of the cylinder and a second end 52 of the cylinder. This through rod or through shaft design provides improved functionality over asymmetric or single entry piston rod designs and eliminates the need for an accumulator to prevent fluid cavitation.

A variety of check valves for providing asymmetrical fluid flow are known in the prior art and may be used with the present invention. Regardless of which check valve is used, the check valve should be directionally oriented within the strut so that the check valve provides greater restriction of fluid flow through the fluid flow path and thereby greater resistance to movement of the tensioner arm when arm is lifted by the belt than when the arm of tensioner moves towards the belt to take up slack. In the embodiment shown in FIG. 1, this means that the check valve 44 should provide greater restriction of fluid flow when the strut 28 is compressed than when the strut 28 is extended. Of course, in other embodiments the points at which the strut 28 is coupled to the arm 22 and the base 20 could be modified so that lifting of the arm 22 by the belt 14 causes the strut 28 to extend. In these embodiments the direction of the check valve would be reversed from that shown in FIG. 3, for example, by placing the check valve on the opposite side of the piston.

Figure 4:
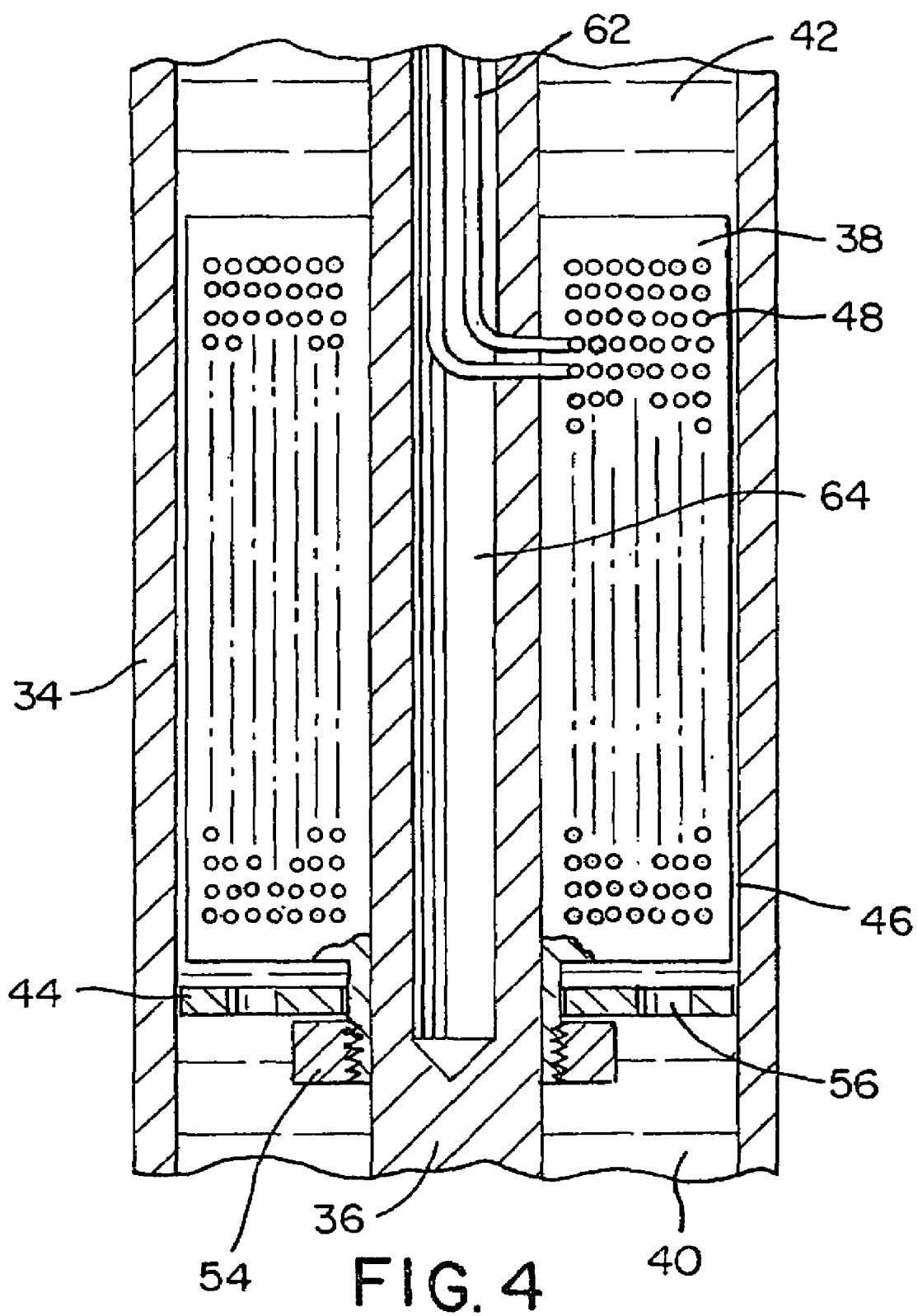
FIG. 4 is an enlarged cross section of the piston and check valve of the hydraulic strut of FIG. 3.

Referring to FIGS. 3 and 4, the flow path 46 between the first and second fluid chambers 40, 42 may comprise an annular space between the inner diameter of the hydraulic cylinder and the outer diameter of the piston. The radial width of the annular space may be approximately 0.8 mm for a 26 mm diameter piston. The axial length of the annular space may be approximately 30 mm. Alternatively or in addition, the flow path may comprise one or more axial passages through the piston.

The check valve 44 may comprise a floating plate or disc that is received over the piston rod 36 and trapped between the piston 38 and a stop 54, The stop is positioned apart from the piston 38 on the piston rod 36 a sufficient distance to allow the check valve 44 to float between the piston 38 and the stop 54. An aperture 56 through the floating plate permits relatively unrestricted fluid flow when the check valve 44 is open, i.e., when fluid flow between the first and second fluid chambers 40, 42 causes the floating plate to rest against the stop 54. By contrast, when fluid flow between the first and second fluid chambers 40, 42 causes the floating plate to rest against the piston 38, i.e., when the check valve 44 is closed, the aperture 56 through the plate will become substantially blocked thereby severely restricting fluid flow through the check valve 44. Even in the closed position, some fluid flow is still possible through or around the check valve as a result of gaps between the plate and the cylinder that permit the plate to float. For example, a radial gap of approximately 0.2 mm may be left between the outer diameter of the floating plate and the inner diameter of the cylinder 34. The amount of viscous damping that is provided by the check valve can be controlled by selecting the size of the floating plate, the size of the aperture in the plate and the viscosity of the fluid in the first and second fluid chambers. The floating plate may be made from stainless steel, nickel, brass or any suitable nonmagnetic material including polymers.

The tensioner may further include one or more sensors 58 and a controller 60 to actively control the tensioner 18 in response to a variety of engine conditions. Specifically, the controller 60 is operable to energize the coil 48 in response to a sensed engine parameter to thereby lock the tensioner solid. The engine sensor 58 may be a speed sensor, and accelerometer, or any other sensor from which a change in belt tension can be predicted or measured. The controller 60, which is operatively coupled to the sensor 58 for receiving a signal therefrom, is operable to energize the coil 48 based, at least in part, on the signal received from the engine sensor 58. Referring to FIGS. 3 and 4, in an embodiment in which the coil 48 is located within the piston 38, power can be supplied to the coil 48 by the controller 60 through leads 62 that extend through a central bore 64 in the piston rod 36. In other possible embodiments the coil 48 may be located outside of the cylinder 34.

In addition to, or instead of an engine parameter sensor 58, the controller 60 may be operatively coupled to a transmission computer 66, which is a known component in many existing vehicles. The transmission computer 66, which is responsible for controlling gear shifts in the transmission, may be operable to provide a signal indicating either a present or an impending gear shift. The controller 60 may be operatively coupled to the transmission computer 66 for receiving such signal and is operable to energize the coil 48 based, at least in part, on the signal received from the transmission computer 66.

By energizing the coil 48 to generate a magnetic field across the fluid flow path 46 the tensioner can be locked such that the strut 28 cannot extend or contract and such that the arm 22 cannot pivot. Specifically, through operation of the magnetic field on the MR fluid in the fluid flow path, the flow of fluid can be halted. The manipulation of a MR fluid using a magnetic field is well known. In this particular operation, the point at which fluid flow is halted will be governed by the properties of the particular MR fluid that is chosen, the dimensions of the fluid flow path and the strength of the magnetic field produced.

In the tensioner's free mode, i.e., when the coil is deactivated, the tensioner functions as an asymmetric viscous damped tensioner. Specifically, when the belt 14 tries to lift the tensioner arm 22 as a result of increasing tension in the belt, the check valve 44 closes to provide substantial hydraulic damping. By contrast, when the tensioner arm 22 moves towards the belt 14 to take up slack, the check valve 44 opens so that the arm 22 can move with very little hydraulic resistance. The amount of damping produced by the tensioner is controlled by the size of the floating valve plate, the size of the aperture through the plate and the viscosity of the working fluid.

As a result of the tensioner's asymmetric damping in the free mode, when the tensioner is subjected to a pulsing tension, such as occurs at low idle due to engine combustion events that are reflected through the crankshaft pulley into the belt, the average belt tension level will increase as a result of the tensioner arm moving toward the belt more readily than it moves away. This is a desirable result to temporarily raise the tension when high torque pulses are occurring. The average tension will slowly drop once the pulsation level drops.

To switch from the tensioner's free mode to the locked-up mode the coil may be activated by, for example, 12 volts or any appropriate voltage on the vehicle. When the coil is activated current flows through it creating a magnetic field in the coil's iron core. This magnetic field follows the path of the iron core and is applied to the MR fluid in the fluid flow path.

The ability to completely lock up the tensioner is desirable during certain operating conditions. For example, during cranking at engine start-up, accessory drive system resonances can occur that can cause excessive tensioner motion. Thus, once the tensioner has adjusted for the accessory loads, it should be locked, through engine ignition and up to engine idle, where it can be unlocked again to respond to accessory loads. During normal steady state operation the tensioner should be unlocked, so as to properly adjust the belt tension to the needs of the accessories. If an engine condition of extended high torque pulses occurs and is maintained for over a few seconds, the tensioner should again be locked so as to preclude excessive motion of the tensioner. The very nature of a belt torque pulse will pump up the asymmetric damped tensioner through a hydraulic ratcheting action. This higher level of tension can then be retained by activating the coil until the torque pulse condition is over, as sensed by, for example, an existing engine rotation magnetic sensor. Once the high torque pulse condition subsides, the tensioner can be unlocked to properly adjust to accessory loads. Thus, it would be just a matter of adding computer logic to the controller to release the locked tensioner once the torque pulses have dropped to a specified level.

In addition, it may be desirable to lock the tensioner during a transmission upshift. For example, if a transmission upshift could be predicted through measurement of engine conditions or using the transmission computer, the tensioner could be locked approximately 100 milliseconds before a transmission upshift and then unlocked at the conclusion of the shift.

To achieve a fast response time when transitioning from the free mode to the locked-up mode, a full or maximum voltage (e.g., 12 volts) may be applied initially to the coil. After the current in the coil reaches a certain level, however, the voltage may be dropped or tapered off. This can be done either with an op amp circuit or by switching from a direct path to a path with a resistor in it at a certain time increment.

Although certain embodiments of the present invention have been described in detail, various modifications may be made to the disclosed embodiments without departing from the scope of the inventions defined in the following claims. It is intended that all such modifications be considered part of the present invention.

What is claimed is:

1. A tensioner for a power-transmitting belt comprising:
   a base;
   an arm pivotably attached to the base;
   a pulley rotatably attached to the arm for engaging a power-transmitting belt;
   a spring operatively connected to the arm and the base for urging the arm to pivot relative to the base such that the pulley on the arm engages the belt with a force to tension the belt; and
   a hydraulic strut pivotably attached at a first point to the base and pivotably attached at a second point to the arm such that pivotal movement of the arm on the base either extends or compresses the strut, the strut operable to restrict movement of the arm through asymmetric fluid damping, the strut comprising:
      a hydraulic cylinder;
      a piston rod axially mounted through the cylinder for relative reciprocal movement;
      a piston mounted on the piston rod for reciprocal movement therewith within the cylinder, the piston dividing the cylinder into a first fluid chamber and second fluid chamber;
      a fluid flow path between the first and second fluid chambers;
      a check valve within the hydraulic cylinder to provide greater restriction of fluid flow through the fluid flow path when the arm is lifted by the belt than when the arm moves toward the belt; and
      an electro-magnetic coil operable to generate a magnetic field across the fluid flow path when the electro-magnetic coil is energized;
   wherein the first and second fluid chambers within the strut contain magnetorheological fluid.

2. A tensioner as claimed in claim 1, wherein a first end of the piston rod extends through a first end of the hydraulic cylinder and a second end of the piston rod extends through a second end of the hydraulic cylinder.

3. A tensioner as claimed in claim 1, wherein the piston rod is pivotably attached to the base and the hydraulic cylinder is pivotably attached to the arm such that pivotal movement of the arm on the base causes the hydraulic cylinder to slide over the piston rod.

4. A tensioner as claimed in claim 1, wherein the hydraulic cylinder is pivotably attached to base and the piston rod is pivotably attached to the arm such that pivotal movement of the arm on the base causes the piston rod to slide through the hydraulic cylinder.

5. A tensioner as claimed in claim 1, wherein the flow path comprises an annular space between an outer diameter of the piston and an inner diameter of the hydraulic cylinder.

6. A tensioner as claimed in claim 1, wherein the check valve provides greater restriction of fluid flow through the fluid flow path and thereby greater resistance to movement of the arm when the arm of the tensioner is lifted by the belt than when the arm of the tensioner moves towards the belt.

7. A tensioner as claimed in claim 1, wherein the strut is pivotably attached to the arm such that the strut will be compressed when the belt lifts the tensioner arm and the strut will extend when the tensioner arm moves towards the belt.

8. A tensioner as claimed in claim 7, wherein the check valve provides greater restriction of fluid flow through the fluid flow path and thereby greater resistance to movement of the arm when the strut is compressed than when the strut is extended.

9. A tensioner as claimed in claim 1, wherein the check valve opens in response to fluid flow in a first direction through the fluid flow path and closes in response to fluid flow in a second direction through the fluid flow path.

10. A tensioner as claimed in claim 1, wherein the strut further comprises a stop that is positioned apart from the piston along the piston rod a suitable distance to allow the check valve to float between the stop and the piston and coupled to the piston rod for movement therewith, and wherein the check valve comprises a floating plate that is received over the piston rod and that is trapped between the stop and the piston, the plate including an aperture to permit fluid flow through the plate between the first and second fluid chambers, the aperture being substantially blocked when fluid flow in the strut causes the plate to rest against the piston and the aperture being unblocked when fluid flow in the strut causes the plate to rest against the stop.

11. A tensioner as claimed in claim 1, further comprising:
a controller operatively coupled to the electro-magnetic coil; and
an engine sensor operatively coupled to the controller and operable to provide a signal to the controller, wherein the controller is operable to energize the electro-magnetic coil based, at least in part, on the signal received from the engine sensor.

12. A tensioner as claimed in claim 1, further comprising:
a controller operatively coupled to the electro-magnetic coil; and
a transmission computer operatively coupled to the controller and operable to provide a signal to the controller indicating a gear shift in the transmission, wherein the controller is operable to energize the electro-magnetic coil based at least in part on the signal received from the transmission computer.

13. A tensioner as claimed in claim 1, wherein the tensioner is operable in a free mode and a locked-up mode, the free mode characterized by the coil being de-energized such that the strut may be either extended or compressed and the arm may pivot either in a first direction toward the belt or a second direction away from the belt, the locked-up mode characterized by the coil being energized such that the strut may not be extended or compressed and such that the arm may not pivot.

14. A tensioner for a power-transmitting belt comprising:
a base;
an arm pivotably attached to the base;
a pulley rotatably attached to the arm for engaging a power-transmitting belt;
a spring operatively connected to the arm and the base for urging the arm to pivot relative to the base such that the pulley on the arm engages the belt with a force to tension the belt; and
a hydraulic strut pivotably attached at a first point to the base and pivotably attached at a second point to the arm such that pivotal movement of the arm on the base either extends or compresses the strut, the strut operable to restrict movement of the arm through asymmetric fluid damping, the strut comprising:
a hydraulic cylinder;
a piston rod axially mounted in the cylinder for relative reciprocal movement;
a piston mounted on the piston rod for reciprocal movement therewith within the cylinder, the piston dividing the cylinder into a first fluid chamber and second fluid chamber;
a fluid flow path between the first and second fluid chambers;
a check valve within the hydraulic cylinder to provide greater restriction of fluid flow through the fluid flow path when the arm is lifted by the belt than when the arm moves toward the belt; and
an electro-magnetic coil operable to generate a magnetic field across the fluid flow path when the electro-magnetic coil is energized;
wherein the first and second fluid chambers within the strut contain magnetorheological fluid; and
wherein when the electro-magnetic coil is energized fluid flow between the first and second fluid chambers is halted such that the arm of the tensioner locks up.

15. A tensioner as claimed in claim 14, wherein a first end of the piston rod extends through a first end of the hydraulic cylinder and a second end of the piston rod extends through a second end of the hydraulic cylinder.

16. A tensioner as claimed in claim 14, wherein the check valve opens in response to fluid flow in a first direction through the fluid flow path and closes in response to fluid flow in a second direction through the fluid flow path.

17. A tensioner as claimed in claim 14, wherein the strut further comprises a stop that is positioned apart from the piston along the piston rod a suitable distance to allow the check valve to float between the stop and the piston and coupled to the piston rod for movement therewith, and wherein the check valve comprises a floating plate that is received over the piston rod and that is trapped between the stop and the piston, the plate including an aperture to permit fluid flow through the plate between the first and second fluid chambers, the aperture being substantially blocked when fluid flow in the strut causes the plate to rest against the piston and the aperture being unblocked when fluid flow in the strut causes the plate to rest against the stop.

18. A tensioner as claimed in claim 14, further comprising:
a controller operatively coupled to the electro-magnetic coil; and
an engine sensor operatively coupled to the controller and operable to provide a signal to the controller, wherein the controller is operable to energize the electro-magnetic coil based, at least in part, on the signal received from the engine sensor.

19. A tensioner as claimed in claim 14, further comprising:
a controller operatively coupled to the electro-magnetic coil; and
a transmission computer operatively coupled to the controller and operable to provide a signal to the controller indicating a gear shift in the transmission, wherein the controller is operable to energize the electro-magnetic coil based at least in part on the signal received from the transmission computer.

20. An asymmetric, magnetorheological, fluid damper comprising:
a hydraulic cylinder containing magnetorheological fluid;
a piston rod axially mounted through the cylinder for relative reciprocal movement;
a piston mounted on the piston rod for reciprocal movement therewith within the cylinder, the piston dividing the cylinder into a first fluid chamber and second fluid chamber;
a fluid flow path between the first and second fluid chambers;
a check valve within the hydraulic cylinder to provide greater restriction of fluid flow through the fluid flow path when the arm is lifted by the belt than when the arm moves toward the belt; and an electro-magnetic coil operable to generate a magnetic field across the fluid flow path when the electro-magnetic coil is energized;

wherein the damper is operable in a free and a locked-up mode, the locked-up mode characterized by the electro-magnetic coil being energized such that the fluid flow through the fluid flow path is halted to lock-up the damper.

* * * * *